United States Patent
Chen

(10) Patent No.: US 11,698,880 B2
(45) Date of Patent: *Jul. 11, 2023

(54) SYSTEM ON CHIP AND DEVICE LAYER

(71) Applicant: Nuvoton Technology Corporation, Hsinchu (TW)

(72) Inventor: Shun-Hsiung Chen, Hsinchu (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,544

(22) Filed: Jun. 21, 2022

(65) Prior Publication Data

US 2022/0318175 A1   Oct. 6, 2022

Related U.S. Application Data

(63) Continuation of application No. 17/137,954, filed on Dec. 30, 2020, now Pat. No. 11,372,793.

(30) Foreign Application Priority Data

Jun. 19, 2020 (TW) ................. 109120752

(51) Int. Cl.
    *G06F 13/40* (2006.01)
    *G16Y 10/75* (2020.01)
    *G16Y 30/10* (2020.01)

(52) U.S. Cl.
    CPC .......... *G06F 13/4027* (2013.01); *G16Y 10/75* (2020.01); *G16Y 30/10* (2020.01)

(58) Field of Classification Search
    CPC ..................... G06F 13/0027; G16Y 10/75
    See application file for complete search history.

(56) References Cited

U.S. PATENT DOCUMENTS 7,743,191 B1   6/2010   Liao
8,549,463 B2   10/2013   Sanjive
(Continued)

FOREIGN PATENT DOCUMENTS

CN   105093984 A   11/2015
CN   105608022 A   5/2016
(Continued)

OTHER PUBLICATIONS

Office Action dated May 26, 2021 in TW Application No. 109120752, 8 pages.
(Continued)

*Primary Examiner* — Henry Tsai
*Assistant Examiner* — Christopher A Daley
(74) *Attorney, Agent, or Firm* — Muncy, Geissler, Olds & Lowe, P.C.

(57) ABSTRACT

A system on chip including a first master circuit, a second master circuit, a routing circuit, a bridge control circuit, and a peripheral circuit is provided. The first master circuit provides a first command. The second master circuit provides a second command. The routing circuit receives the first command and the second command and provides an output command. The bridge control circuit receives the output command and stores an attribute setting value. In response to the routing circuit receiving the first command and the first command pointing to the peripheral circuit, the routing circuit uses the first command as the output command and the bridge control circuit determines whether attribute information of the output command matches the attribute setting value. In response to the attribute information of the output command matching the attribute setting value, the bridge control circuit provides the output command to the peripheral circuit.

20 Claims, 6 Drawing Sheets

(56) References Cited

U.S. PATENT DOCUMENTS

| | | | |
|---|---|---|---|
| 10,515,044 B2 * | 12/2019 | Wietfeldt | G06F 9/542 |
| 11,372,793 B2 * | 6/2022 | Chen | G06F 13/4027 |
| 2002/0162043 A1 | 10/2002 | Messmer et al. | |
| 2008/0282007 A1 * | 11/2008 | Moran | G06F 13/362 |
| | | | 710/110 |
| 2012/0036305 A1 * | 2/2012 | Lais | G06F 13/36 |
| | | | 710/313 |
| 2019/0199875 A1 | 6/2019 | Komatsu | |

FOREIGN PATENT DOCUMENTS

| | | |
|---|---|---|
| CN | 107018165 A | 8/2017 |
| CN | 107070926 A | 8/2017 |
| CN | 108432213 A | 8/2018 |
| TW | 200508961 A | 3/2005 |
| TW | 201826139 A | 7/2018 |
| TW | 201923603 A | 6/2019 |

OTHER PUBLICATIONS

Office Action dated Oct. 29, 2021 in TW application No. 109120752, 8 pages.
Office Action dated Dec. 14, 2021 in TW Application No. 110104508, 8 pages.

* cited by examiner

SYSTEM ON CHIP AND DEVICE LAYER

CROSS REFERENCE TO RELATED APPLICATIONS

This application is a Continuation of application Ser. No. 17/137,954, filed Dec. 30, 2020, which claims priority of Taiwan Patent Application No. 109120752, filed on Jun. 19, 2020, which are hereby incorporated by reference in their entirety.

BACKGROUND OF THE INVENTION

Field of the Invention

The invention relates to an electronic device, and more particularly to a system on chip (SOC).

Description of the Related Art

Since the Internet of things (IOT) is capable of connecting many products to the Internet to achieve the purpose of object identification and intelligent management, IOT is gradually used in many fields. Furthermore, IOT can reduce energy consumption and improve people's lives. However, with the flourishing development of IOT, security is a very important requirement.

BRIEF SUMMARY OF THE INVENTION

In accordance with an embodiment of the disclosure, a system on chip comprises a first master circuit, a second master circuit, a routing circuit, a bridge control circuit, and a peripheral circuit. The first master circuit provides a first command. The second master circuit provides a second command. The routing circuit receives the first command and the second command and provides an output command. The bridge control circuit receives the output command and stores an attribute setting value. In response to the routing circuit receiving the first command and the first command pointing to the peripheral circuit, the routing circuit uses the first command as the output command and the bridge control circuit determines whether attribute information of the output command matches the attribute setting value. In response to the attribute information of the output command matching the attribute setting value, the bridge control circuit provides the output command to the peripheral circuit.

In accordance with a further embodiment of the disclosure, a device layer comprises a routing circuit, a first bridge control circuit, and a second bridge control circuit. The routing circuit uses a first command as a first output command or a second output command. The first bridge control circuit receives the first output command, stores a first attribute setting value, and is coupled to a first peripheral circuit. The second bridge control circuit receives the second output command, stores a second attribute setting value, and is coupled to a second peripheral circuit.

In accordance with a further embodiment of the disclosure, a system on chip comprises a first peripheral circuit, a second peripheral circuit, and a bridge control circuit. The bridge control circuit stores a first attribute setting value and a second attribute setting value, and determines that attribute information of an output command matches the first attribute setting value or the second attribute setting value. In response to the attribute information of the output command matching the first attribute setting value, the bridge control circuit provides the output command to the first peripheral circuit. In response to the attribute information of the output command matching the second attribute setting value, the bridge control circuit provides the output command to the second peripheral circuit.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

Figure 1:
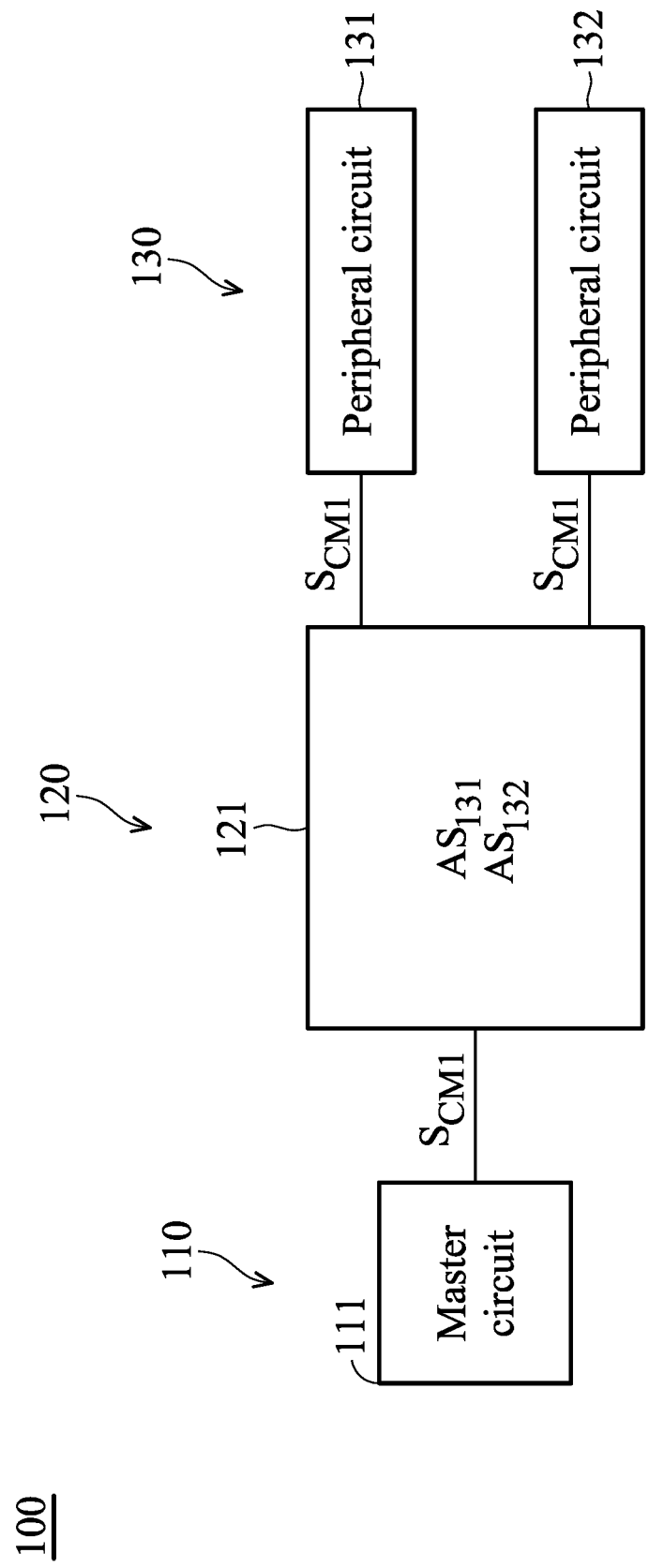
FIG. 1 is a schematic diagram of an exemplary embodiment of a system on chip, according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of a system on chip, according to various aspects of the present disclosure. The system on chip (SOC) 100 comprises a master layer 110, a device layer 120, and a peripheral layer 130. In this embodiment, the master layer 110 comprises a master circuit 111. The master circuit 111 is configured to send a command $S_{CM1}$. The kind of master circuit 111 is not limited in the present disclosure. Any circuit can serve as the master circuit 111, as long as the circuit is capable of processing data. In one embodiment, the master circuit 111 is a processor or a memory transfer controller, such as a direct memory access controller. In another embodiment, the master circuit 111 is a secure device which is configured to perform high-security actions, such as a mobile payment. In some embodiments, the master circuit 111 is a data processing unit, such as an encryption/decryption circuit or a convolutional neuro network accelerator. In other embodiments, the master layer 110 has more master circuits.

The device layer 120 comprises a peripheral circuit 121. The peripheral circuit 121 stores attribute setting values $AS_{131}$ and $AS_{132}$. In this embodiment, the bridge control circuit 121 decodes the command $S_{CM1}$ to obtain address information and attribute information. The bridge control circuit 121 determines that the command $S_{CM1}$ points to the peripheral circuit 131 or 132 according to the address information. Assume that the command $S_{CM1}$ points to the peripheral circuit. In such case, the bridge control circuit 121 compares the attribute information of the command $S_{CM1}$ and the attribute setting value $AS_{131}$. When the attribute information of the command $S_{CM1}$ matches the attribute setting value $AS_{131}$, it means that the master circuit 111 has the power to access the peripheral circuit 131. Therefore, the bridge control circuit 121 transmits the command $S_{CM1}$ to the peripheral circuit 131.

In other embodiments, when the command $S_{CM1}$ points to the peripheral circuit 132, the bridge control circuit 121 compares the attribute information of the command $S_{CM1}$ with the attribute setting value $AS_{132}$. When the attribute information of the command $S_{CM1}$ matches the attribute setting value $AS_{132}$, it means that the master circuit 111 is the power to access the peripheral circuit 132. Therefore, the bridge control circuit 121 provides the peripheral circuit 132 with the command $S_{CM1}$.

The number of attribute setting values stored in the bridge control circuit 121 is not limited in the present disclosure. In other embodiments, when the bridge control circuit 121 is coupled to more or fewer peripheral circuits, the bridge control circuit 121 may store more or fewer attribute setting values. In such cases, different attribute setting values correspond to different peripheral circuits. In some embodiments, the command $S_{CM1}$ is referred to as an output command or an external command.

The structure of device layer 120 is not limited in the present disclosure. In one embodiment, the device layer 120 serves as a bridge between a high frequency circuit (e.g., the master layer 110) and a low frequency circuit (e.g., the peripheral layer 130). For example, the operation frequency of each element disposed in the master layer 110 may be higher than 100 MHz or even higher than 1 GHz. The operation frequency of each element in the peripheral layer 130 may be lower than 10 MHz even lower than 1 KHz. In one embodiment, the bridge control circuit 121 comprises a peripheral bridge configured to assign the command $S_{CM1}$ to the peripheral circuit 131 or 132. In another embodiment, the bridge control circuit 121 further comprises a resource domain access controller. In this case, the resource domain access controller has a decoding function and a comparison function.

In some embodiments, the bridge control circuit 121 may comprise a decoding circuit (not shown), a comparison circuit (not shown), and an assignment circuit (not shown). In such cases, the decoding circuit is configured to decode the command $S_{CM1}$ to generate the address information and the attribute information. The comparison circuit compares the attribute information with each of the attribute setting values $AS_{131}$ and $AS_{132}$ according to the address information. For example, when the address information points to the peripheral circuit 131, the comparison circuit compares the attribute information with the attribute setting value $AS_{131}$ to generate a comparison result. When the address information points to the peripheral circuit 132, the comparison circuit compares the attribute information with the attribute setting value $AS_{132}$ to generate another comparison result. The assignment circuit assigns the command $S_{CM1}$ to the peripheral circuit 131 or 132 according to the comparison results. For example, when the address information of the command $S_{CM1}$ points to the peripheral circuit 131 and the attribute information of the command $S_{CM1}$ matches the attribute setting value $AS_{131}$, the assignment circuit provides the command $S_{CM1}$ to the peripheral circuit 131. When the address information of the command $S_{CM1}$ points to the peripheral circuit 132 and the attribute information of the command $S_{CM1}$ matches the attribute setting value $AS_{132}$, the assignment circuit provides the command $S_{CM1}$ to the peripheral circuit 132.

In other embodiments, when the address information of the command $S_{CM1}$ points to the peripheral circuit 131 and the attribute information of the command $S_{CM1}$ does not match the attribute setting value $AS_{131}$, it means that the command $S_{CM1}$ is an illegal command sent from a malicious software which attempts to tamper with data stored in the peripheral circuit 131. Therefore, the bridge control circuit 121 does not provide the command $S_{CM1}$ to the peripheral circuit 131. In one embodiment, the bridge control circuit 121 may send an interruption signal to notify other elements of the system on chip 100 that an illegal access is performed. In some embodiments, the bridge control circuit 121 may perform a security setting, such as to generate an error response to the master circuit 111. In one embodiment, if the command $S_{CM1}$ is a read command, the bridge control circuit 121 may reply specific data which is composed of 0, 1, or random codes to the master circuit 111. If the command $S_{CM1}$ is a write command, the bridge control circuit 121 ignore the write data from the master circuit 111.

Similarly, when the address information of the command $S_{CM1}$ points to the peripheral circuit 132 and the attribute information of the command $S_{CM1}$ does not match the attribute setting value $AS_{132}$, it means that the command $S_{CM1}$ is an illegal command sent from a malicious software which attempts to tamper with data stored in the peripheral circuit 132. Therefore, the bridge control circuit 121 does not provide the command $S_{CM1}$ to the peripheral circuit 132. In one embodiment, the bridge control circuit 121 may send an interruption signal to notify other elements of the system on chip 100 that an illegal access is performed. In other embodiments, the bridge control circuit 121 may perform a security setting, such as to generate an error response to the master circuit 111 or to execute a specific action, such as to reply specific data to the master circuit 111 or to ignore the write data from the master circuit 111.

The peripheral layer 130 comprises the peripheral circuits 131 and 132. In one embodiment, the peripheral circuits 131 and 132 are end devices. The types of peripheral circuits 131 and 132 are not limited in the present disclosure. Any circuit can serve as the peripheral circuit 131 or 132, as long as the circuit is capable of performing commands.

For example, assume that the peripheral circuit 131 is an encryption/decryption circuit. In this case, the peripheral circuit 131 performs an encryption/decryption action according to the command $S_{CM1}$. In other embodiments, when the peripheral circuit 131 is a communication circuit, the peripheral circuit 131 performs a communication action according to the command $S_{CM1}$. The peripheral circuit 131 may output the command $S_{CM1}$ to other elements disposed outside of the system on chip 100 or receive signals or commands from other elements disposed outside of the system on chip 100.

Figure 2:
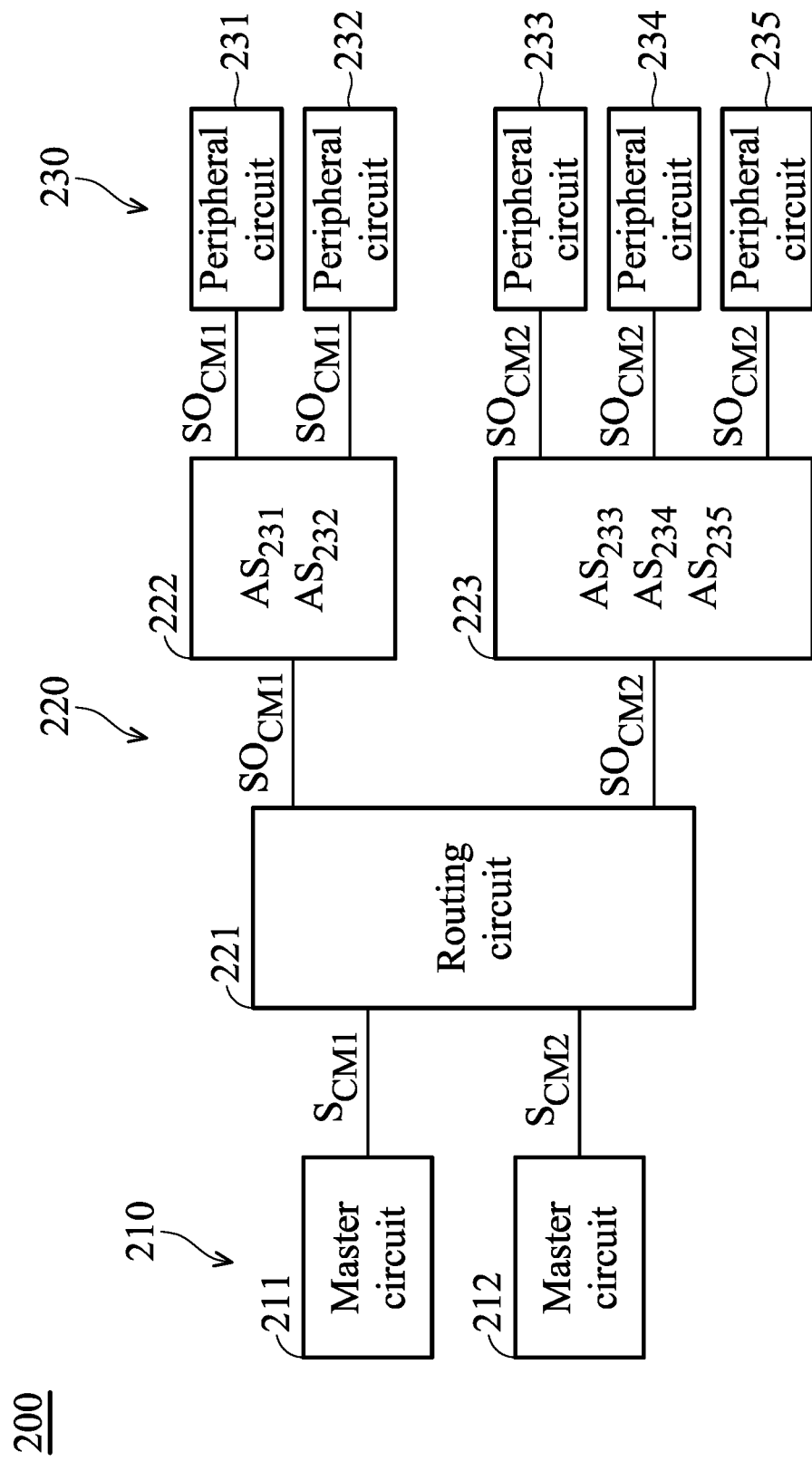
FIG. 2 is a schematic diagram of another exemplary embodiment of the system on chip, according to various aspects of the present disclosure.

FIG. 2 is a schematic diagram of another exemplary embodiment of the system on chip, according to various aspects of the present disclosure. The system on chip 200 comprises a master layer 210, a device layer 220, and a peripheral layer 230. In this embodiment, the master layer 210 comprises master circuits 211 and 212. The master circuit 211 generates the command $S_{CM1}$. The master circuit 212 generates the command $S_{CM2}$. The structure of each of the master circuits 211 and 212 is not limited in the present disclosure. In some embodiments, the master circuits 211 and 212 have the same function. For example, each of the master circuits 211 and 212 is a secure device, a non-secure device, a privilege device or a non-privilege device. In other embodiments, the master circuits 211 and 212 have different functions. For example, the master circuit 211 is one of a secure device, a non-secure device, a privilege device and a non-privilege device. In such cases, the master circuit 212 is another of a secure device, a non-secure device, a privilege device and a non-privilege device. In one embodiment, the master circuit 211 is a secure device, and the master circuit 212 is a privilege device. In another embodiment, the master circuit 211 is a secure device, and the master circuit 212 is a non-privilege device. In some embodiments, the master circuit 211 is a non-secure device, and the master circuit 212 is a privilege device. The master circuit 211 may be a non-secure device, and the master circuit 212 is a non-privilege device. Since the operation of each of the master circuits 211 and 212 is the same as the operation of the master circuit 111, the descriptions of the master circuits 211 and 212 are omitted. Additionally, the number of master circuits is not limited in the present disclosure. In some embodiment, the master layer 210 has more or fewer master circuits.

In this embodiment, the device layer 220 comprises a routing circuit 221, bridge control circuits 222 and 223. The routing circuit 221 generates at least one of the output commands $SO_{CM1}$ and $SO_{CM2}$ according to the address information of external commands (e.g., $S_{CM1}$ and $S_{CM2}$). For example, when the routing circuit 221 receives the command. $S_{CM1}$, if the address information of command $S_{CM1}$ points the peripheral circuit 231 or 232, the routing circuit 221 uses the command $S_{CM1}$ as the output command $SO_{CM1}$ and provides the output command $SO_{CM1}$ to the bridge control circuit 222. However, if the address information of command $S_{CM1}$ points to anyone of the peripheral circuits 233~235, the routing circuit 221 uses the command $S_{CM1}$ as the output command $SO_{CM2}$ and provides the output command $SO_{CM2}$ to the bridge control circuit 223.

Similarly, when the routing circuit 221 receives the command $S_{CM2}$, if the address information of command $S_{CM2}$ points the peripheral circuit 231 or 232, the routing circuit 221 uses the command $S_{CM2}$ as the output command $SO_{CM1}$ and provides the output command $SO_{CM1}$ to the bridge control circuit 222. However, if the address information of command $S_{CM2}$ points to anyone of the peripheral circuits 233~235, the routing circuit 221 uses the command $S_{CM2}$ as the output command $SO_{CM2}$ and provides the output command $SO_{CM2}$ to the bridge control circuit 223.

In other embodiment, when the routing circuit 221 receives the commands $S_{CM1}$ and $S_{CM2}$ simultaneously and the address information of each of the commands $S_{CM1}$ and $S_{CM2}$ points to the same peripheral circuit, the routing circuit 221 uses the commands $S_{CM1}$ and $S_{CM2}$ as the output command $SO_{CM1}$ or $SO_{CM2}$. For example, assume that the priority of the master circuit 211 is higher than the priority of the master circuit 212. In this case, when the routing circuit 221 receives the commands $S_{CM1}$ and $S_{CM2}$ simultaneously and the address information of each of the commands $S_{CM1}$ and $S_{CM2}$ points to the peripheral circuit 231, the routing circuit 221 first uses the command $S_{CM1}$ as the output command $SO_{CM1}$ and provides the output command $SO_{CM1}$ to the bridge control circuit 222. After a predetermined time, the routing circuit 221 uses the command $S_{CM2}$ as the output command $SO_{CM1}$ and provides the output command $SO_{CM1}$ to the bridge control circuit 222. In one embodiment, the priority of each of the master circuits are stored in the routing circuit 221 in advance.

The structure of routing circuit 221 is not limited in the present disclosure. In one embodiment, the routing circuit 221 has a bus matrix architecture. In another embodiment, the routing circuit 221 comprises a router.

The bridge control circuits 222 and 223 determine whether the master circuits providing the external commands have the power to access the corresponding peripheral circuit according to the external commands (e.g., $S_{CM1}$ and $SO_{CM2}$). Since the operation of the bridge control circuit 222 is the same as the operation of the bridge control circuit 223, the bridge control circuit 223 is given as an example. When the routing circuit 221 uses the command $S_{CM2}$ as the output command $SO_{CM2}$, the bridge control circuit 223 decodes the output command $SO_{CM2}$ to determine whether the address information of the output command $SO_{CM2}$ points to one of the peripheral circuits 233, 234 and 235.

Assume that the address information of the output command $SO_{CM2}$ points to the peripheral circuit 233. In this case, the bridge control circuit 223 first determines whether the attribute information of the output command $SO_{CM2}$ matches the attribute setting value $AS_{233}$. When the attribute information of the output command $SO_{CM2}$ matches the attribute setting value $AS_{233}$, it means that the master circuit 212 has the power to access the peripheral circuit 233. Therefore, the bridge control circuit 223 transmits the output command $SO_{CM2}$ to the peripheral circuit 233. The peripheral circuit 233 performs the output command $SO_{CM2}$. However, when the attribute information of the output command $SO_{CM2}$ does not match the attribute setting value $AS_{233}$, it means that the master circuit 212 is not allowed to access the peripheral circuit 233. Therefore, the bridge control circuit 223 does not transmit the output command $SO_{CM2}$ to the peripheral circuit 233. At this time, the bridge control circuit 223 may perform a security action. For example, the bridge control circuit 223 may send an interruption signal to notify other elements of the system on chip 200 that there is an illegal access operation.

The structure of each of the bridge control circuits 222 and 223 is not limited in the present disclosure. In one embodiment, the structure of each of the bridge control circuits 222 and 223 is the same as the structure of the bridge control circuit 121 of FIG. 1, the descriptions of the bridge control circuits 222 and 223 are omitted. In this embodiment, the number of peripheral circuits coupled to the bridge control circuit 222 is different from the number of peripheral circuits coupled to the bridge control circuit 223, but the disclosure is not limited thereto. In other embodiments, the number of peripheral circuits coupled to the bridge control circuit 222 is the same as the number of peripheral circuits coupled to the bridge control circuit 223. Additionally, the number of bridge control circuits is not limited in the present disclosure. In other embodiments, the device layer 220 has more bridge control circuits to assign commands to more peripheral circuits.

In one embodiment, the bridge control circuit 222 has a storage circuit to store the attribute setting values $AS_{231}$ and $AS_{232}$, and the bridge control circuit 223 has another storage circuit to store the attribute setting values $AS_{232}$~$AS_{235}$. In this case, the data lengths of the attribute setting values $AS_{231}$~$AS_{235}$ are the same so that the complexity in hardware or software is reduced. Additionally, since the attribute setting values $AS_{231}$~$AS_{235}$ are distributed to different bridge control circuits, the structure of the system on chip 200 is simplified. The structure of system on chip 200 can also reduce the system verification over-head to make the system bug-free as soon as possible.

The peripheral layer 230 comprises peripheral circuits 231~235, but the disclosure is not limited thereto. In other embodiments, the peripheral layer 230 has more or fewer peripheral circuits. The structure of each of the peripheral circuits 231~235 is not limited in the present disclosure. In one embodiment, the function of one of the peripheral circuits 231~235 is the same as the function of another of the peripheral circuits 231~235. For example, the peripheral circuits 231 and 233 are communication circuits. Since the feature of each of the peripheral circuits 231~235 is the same as the feature of the peripheral circuit 131 of FIG. 1, the descriptions of the peripheral circuits 231~235 are omitted.

Figure 3:
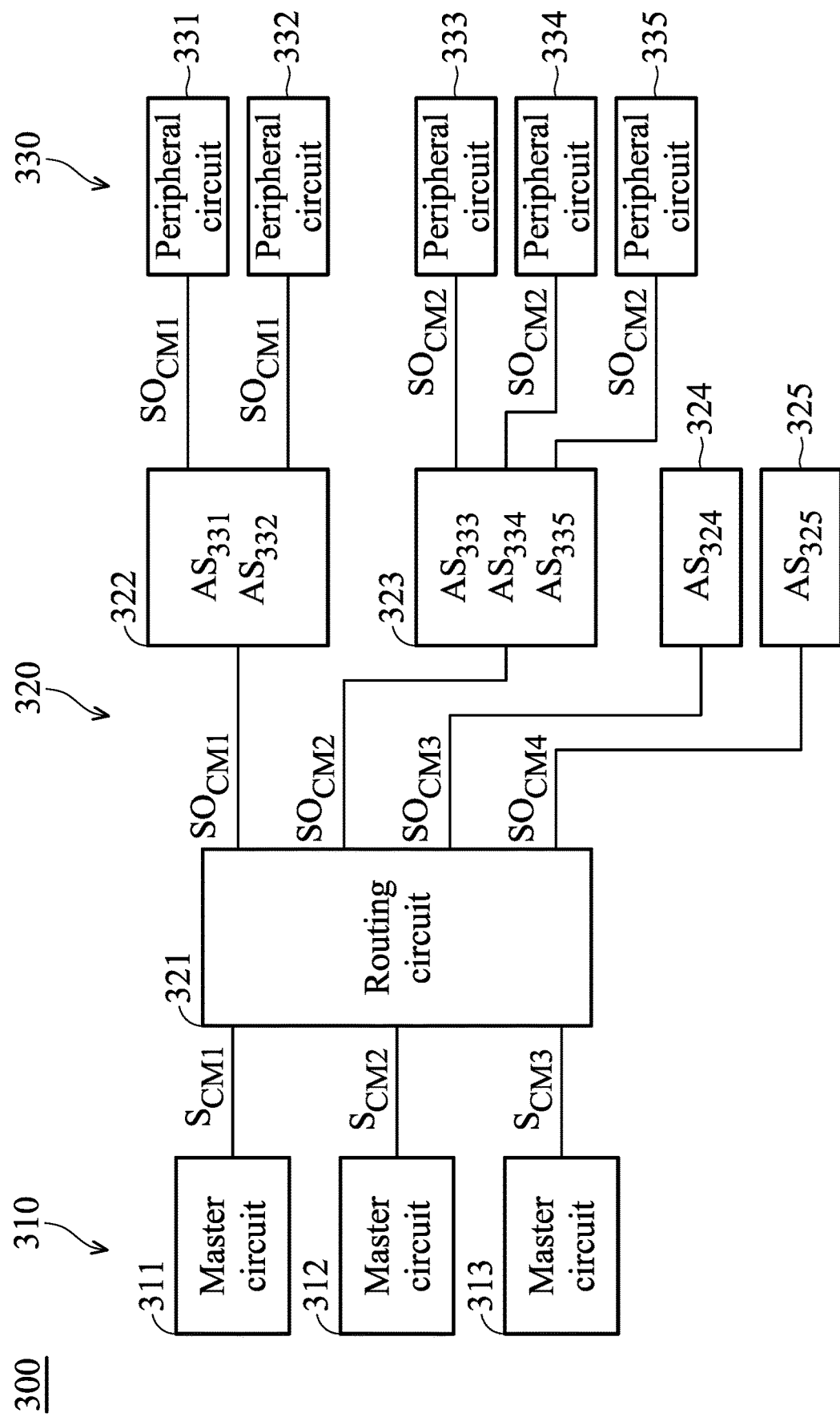
FIG. 3 is a schematic diagram of another exemplary embodiment of the system on chip, according to various aspects of the present disclosure.

FIG. 3 is a schematic diagram of another exemplary embodiment of the system on chip, according to various aspects of the present disclosure. FIG. 3 is similar to FIG. 2 with the exception that the master layer 310 of FIG. 3 further comprises a master circuit 313. The master circuit 313 is configured to generate a command $S_{CM3}$. Since the feature of each of the master circuits 311~313 is the same as the feature of the master circuit 111 of FIG. 1 and the feature of each of the master circuits 211 and 212 of FIG. 2, the descriptions of the master circuits 311~313 are omitted. In one embodiment, the master circuits 311 and 312 are secure devices, and the master circuit 313 is a non-secure device. In other embodiments, the master circuit 313 is a direct memory access (DMA) controller.

In this embodiment, the device layer 320 comprises a routing circuit 321, bridge control circuits 322 and 323, and advance control circuits 324 and 325. Since the features of the routing circuit 321, and the bridge control circuits 322 and 323 are the same as the routing circuit 221 and the bridge control circuits 222 and 223 of FIG. 2, the descriptions of the features of the routing circuit 321, and the bridge control circuits 322 and 323 are omitted.

The advance control circuit 324 stores a device attribute setting value $AS_{324}$. The advance control circuit 325 stores a device attribute setting value $AS_{325}$. In one embodiment, each of the advance control circuits 324 and 324 is an advance device. In this embodiment, the advance control circuits 324 and 325 are directly connected to the routing circuit 321. Therefore, the routing circuit 321 directly provides the output commands $SO_{CM3}$ and $SO_{CM4}$ to the advance control circuits 324 and 325. In such cases, the advance control circuits 324 and 325 are end devices. In this embodiment, the operation frequency of each of the advance control circuits 324 and 325 is higher than the operation frequency of each of the peripheral circuits 331~335. For example, the operation frequency of each of the advance control circuits 324 and 325 may be higher than 100 MHz or even higher than 1 GHz.

Since the operations of the advance control circuits 324 and 325 are the same, the advance control circuit 324 is given as an example. When the routing circuit 321 provides the output command $SO_{CM3}$, the advance control circuit 324 determines whether the attribute information of the output command $SO_{CM3}$ matches the device attribute setting value $AS_{324}$. When the attribute information of the output command $SO_{CM3}$ matches the device attribute setting value $AS_{324}$, the advance control circuit 324 performs the output command $SO_{CM3}$. The type of output command $SO_{CM3}$ is not limited in the present disclosure. When the output command $SO_{CM3}$ is a write command, the advance control circuit 324 performs a write operation. When the output command $SO_{CM3}$ is a read command, the advance control circuit 324 performs a read operation.

In other embodiments, when the attribute information of the output command $SO_{CM3}$ does not match the device attribute setting value $AS_{324}$, it means that the output command $SO_{CM3}$ is an illegal command. Therefore, the advance control circuit 324 does not perform the output command $SO_{CM3}$. In another embodiment, the advance control circuit 324 sends an interruption signal to notify another element (not shown) of the system on chip 300. The number of advance control circuits is not limited in the present disclosure. In other embodiments, the device layer 320 has more or fewer advance control circuits. In such cases, each advance control circuit stores one device attribute setting value.

The structure of each of the advance control circuits 324 and 325 is not limited in the present disclosure. Taking the advance control circuit 324 as an example, the advance control circuit 324 comprises a resource domain access controller (not shown) and a device circuit (not shown). The resource domain access controller is configured to decode the output command $SO_{CM3}$ and determine whether the attribute information of the output command $SO_{CM3}$ matches the device attribute setting value $AS_{324}$. When the attribute information of the output command $SO_{CM3}$ matches the device attribute setting value $AS_{324}$, the device circuit performs an action corresponding to the output command $SO_{CM3}$. In one embodiment, the device circuit is an encryption/decryption circuit to perform an encryption/decryption action. In another embodiment, the device circuit is a gigabit ethernet or a LANDS slave device.

In this embodiment, the peripheral layer 330 comprises peripheral circuits 331~334. Since the feature of each of the peripheral circuits 331~335 is the same as the feature of the peripheral circuit 131 of FIG. 1, the description of the features of the peripheral circuits 331~335 are omitted.

Figure 4:
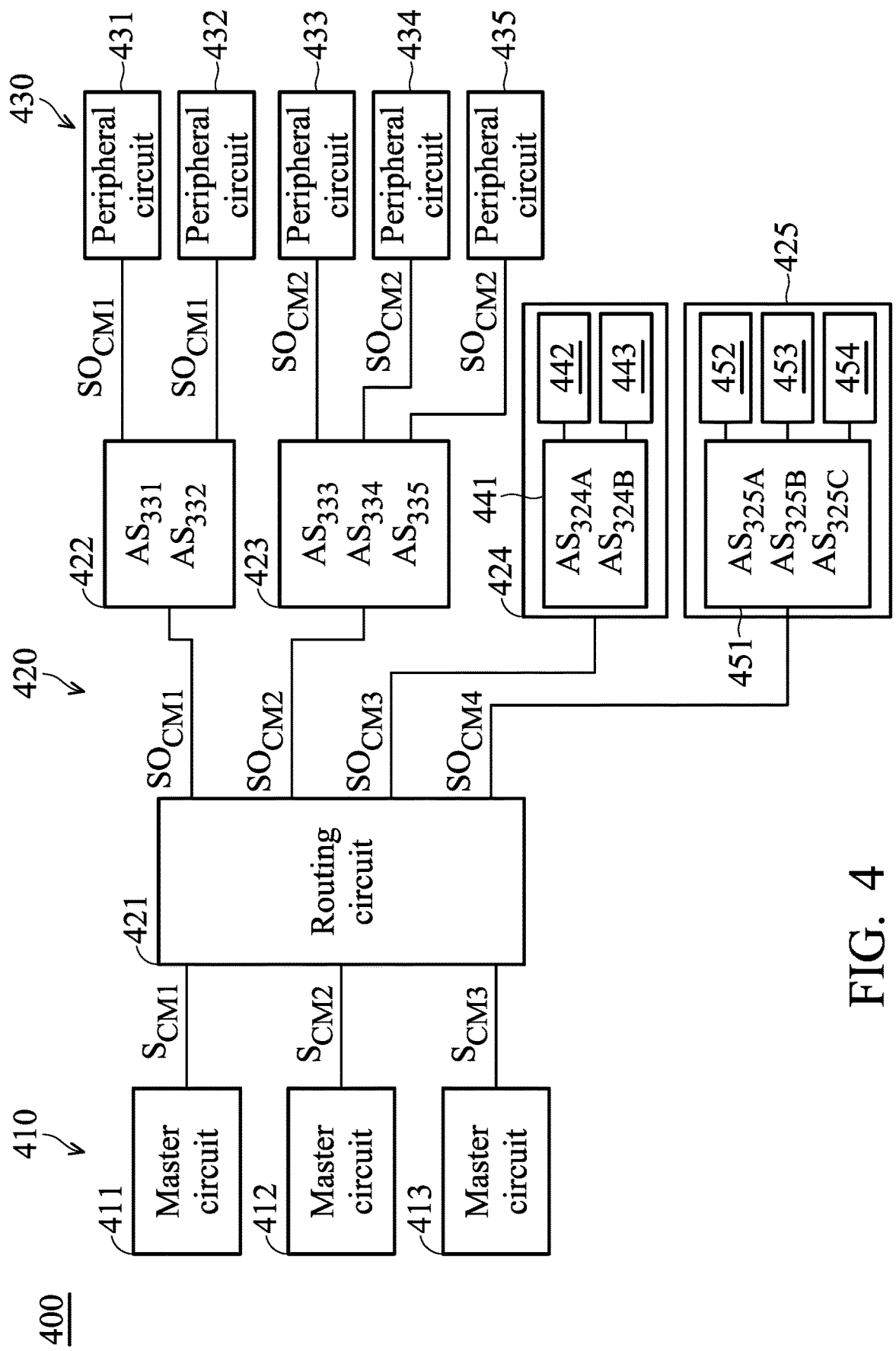
FIG. 4 is a schematic diagram of another exemplary embodiment of the system on chip, according to various aspects of the present disclosure.

FIG. 4 is a schematic diagram of another exemplary embodiment of the system on chip, according to various aspects of the present disclosure. In this embodiment, the system on chip 400 comprises a master layer 410, a device layer 420, and a peripheral layer 430. Since the structures of the master layer 410 and the peripheral layer 430 are the same as the master layer 310 and the peripheral layer 330 of FIG. 3, the descriptions of the structures of the master layer 410 and the peripheral layer 430 are omitted. In this embodiment, the device layer 420 comprises a routing circuit 421, bridge control circuits 422 and 423, and advance control circuits 424 and 425. Since the features of the routing circuit 421 and the bridge control circuits 422 and 423 are the same as the features of the routing circuit 221 and the bridge control circuits 222 and 223, the descriptions of the features of the routing circuit 421 and the bridge control circuits 422 and 423 are omitted.

The advance control circuit 424 comprises a resource domain access controller 441, device circuits 442 and 443. The advance control circuit 425 comprises a resource domain access controller 451 and device circuits 452~454. Since the feature of the advance control circuit 424 is the same as the feature of the advance control circuit 425, the advance control circuit 424 is given as an example to describe the feature of the advance control circuit 424.

The resource domain access controller 441 stores the device attribute setting values $AS_{324A}$ and $AS_{324B}$ and decodes the output command $SO_{CM3}$ to obtain the address information and the attribute information of the output command $SO_{CM3}$. When the address information of the output command $SO_{CM3}$ points to the device circuit 442, the resource domain access controller 441 compares the attribute information of the output command $SO_{CM3}$ and the device attribute setting value $AS_{324A}$. When the attribute information of the output command $SO_{CM3}$ matches the device attribute setting value $AS_{324A}$, the resource domain access controller 441 sends the output command $SO_{CM3}$ to the device circuit 442. Therefore, the device circuit 442 performs the action corresponding to the output command $SO_{CM3}$. However, when the address information of the output command $SO_{CM3}$ points to the device circuit 442 and the attribute information of the output command $SO_{CM3}$ does not match the device attribute setting value $AS_{324A}$, the resource domain access controller 441 may perform a security action, such as to generate an error response.

In other embodiment, when the address information of the output command $SO_{CM3}$ points to the device circuit 443, the resource domain access controller 441 compares the attribute information of the output command $SO_{CM3}$ and the device attribute setting value $AS_{324B}$. When the attribute information of the output command $SO_{CM3}$ matches the device attribute setting value $AS_{324B}$, the resource domain access controller 441 sends the output command $SO_{CM3}$ to the device circuit 443. In this case, the device circuit 443 performs the action corresponding to the output command $SO_{CM3}$. However, when the address information of the output command $SO_{CM3}$ points to the device circuit 443 and the attribute information of the output command $SO_{CM3}$ does not match the device attribute setting value $AS_{324B}$, the resource domain access controller 441 may perform a security action, such as to generate an error response.

The structure of each of the device circuits 442 and 443 is not limited in the present disclosure. In one embodiment, each of the device circuits 442 and 443 is an encryption/decryption circuit, but the encryption/decryption algorithm used by the device circuit 442 is different from the encryption/decryption algorithm used by the device circuit 443. For example, the encryption/decryption algorithm used by the device circuit 442 may be one of DES, RSA, SHA, AES, and ECC. In such cases, the encryption/decryption algorithm used by the device circuit 443 may be another of DES, RSA, SHA, AES and ECC.

In other embodiments, the device attribute setting value $AS_{324A}$ may be stored in the device circuit 442, and the device attribute setting value $AS_{324B}$ may be stored in the device circuit 443. In this case, when the address information of the output command $SO_{CM3}$ points to the device circuit 442, the resource domain access controller 441 reads the device attribute setting value $AS_{324A}$ stored in the device circuit 442 and compares the attribute information of the output command $SO_{CM3}$ and the device attribute setting value $AS_{324A}$. When the attribute information of the output command $SO_{CM3}$ is the same as the device attribute setting value $AS_{324A}$, the resource domain access controller 441 transmits the output command $SO_{CM3}$ to the device circuit 442. Therefore, the device circuit 442 operates according to the output command $SO_{CM3}$.

Similarly, when the address information of the output command $SO_{CM3}$ points to the device circuit 443, the resource domain access controller 441 reads the device attribute setting value $AS_{324B}$ stored in the device circuit 443 and compares the attribute information of the output command $SO_{CM3}$ and the device attribute setting value $AS_{324B}$. When the attribute information of the output command $SO_{CM3}$ is the same as the device attribute setting value $AS_{324B}$, the resource domain access controller 441 transmits the output command $SO_{CM3}$ to the device circuit 443. Therefore, the device circuit 443 operates according to the output command $SO_{CM3}$.

The number of the device attribute setting values stored in the advance control circuit 424 or 425 is not limited in the present disclosure. In this embodiment, the number of the device attribute setting values stored in the advance control circuit 424 is less than the number of the device attribute setting values stored in the advance control circuit 425. In other embodiment, the number of the device attribute setting values stored in the advance control circuit 424 may be the same as or greater than the number of the device attribute setting values stored in the advance control circuit 425.

Figure 5:
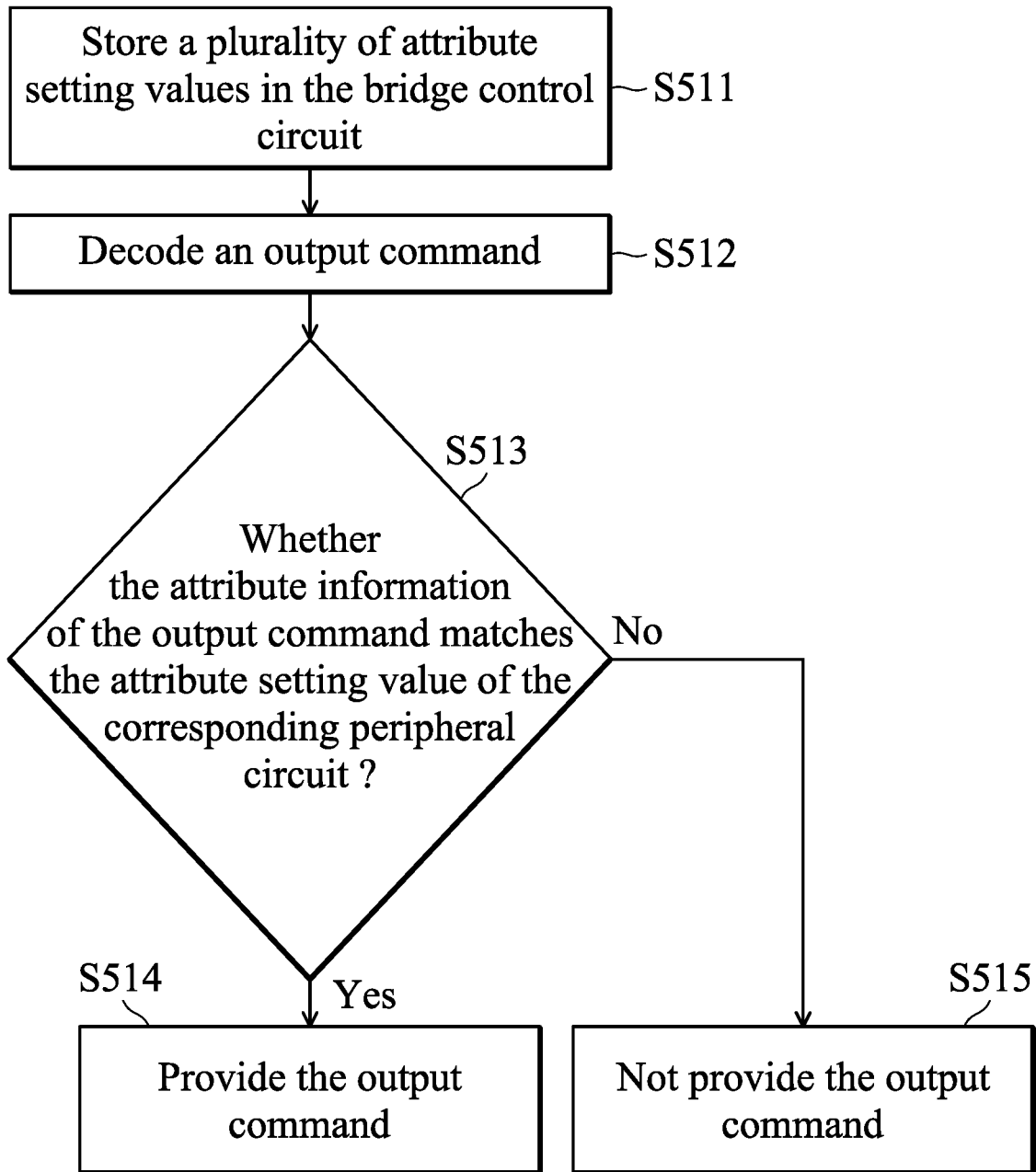
FIG. 5 is a flowchart of an exemplary embodiment of a control method, according to various aspects of the present disclosure.

FIG. 5 is a flowchart of an exemplary embodiment of a control method, according to various aspects of the present disclosure. The control method is applied to the bridge control circuit of a system on chip. The bridge control circuit is coupled to a plurality of peripheral circuits. First, a plurality of attribute setting values are stored in the bridge control circuit (step S511). In this embodiment, each of the attribute setting values corresponds to a peripheral circuit. Taking FIG. 2 as an example, the bridge control circuit 222 stores the attribute setting values $AS_{231}$ and $AS_{232}$. The attribute setting value $AS_{231}$ corresponds to the peripheral circuit 231. The attribute setting value $AS_{232}$ corresponds to the peripheral circuit 232. In other embodiments, when the bridge control circuit is coupled to more peripheral circuits, more attribute setting values are stored in the bridge control circuit.

Next, an output command is decoded to obtain which peripheral circuit is pointed by the output command (step S512). Taking FIG. 2 as an example, when the bridge control circuit 222 receives the output command $SO_{CM1}$, the bridge control circuit decodes the output command $SO_{CM1}$ to obtain that the output command $SO_{CM1}$ points to the peripheral circuit 231 or 232. In FIG. 2, the output command $SO_{CM1}$ is provided by the routing circuit 221, but the disclosure is not limited thereto. In other embodiment, the output command is provided by a master circuit (e.g., the master circuit 111 of FIG. 1).

Then, a determination is made as to whether the attribute information of the output command matches the attribute setting value of the corresponding peripheral circuit (step S513). When the attribute information of the output command matches the attribute setting value of the corresponding peripheral circuit, the output command is provided to the corresponding peripheral circuit (step S514). However, when the attribute information of the output command does not match the attribute setting value of the corresponding peripheral circuit, the output command is not provided to the corresponding peripheral circuit (step S515). In one embodiment, when the attribute information of the output command does not match the attribute setting value of the corresponding end circuit, the bridge control circuit 222 executes a security operation.

Taking FIG. 2 as an example, when the output command $SO_{CM1}$ points to the peripheral circuit 231, the bridge control circuit 222 determines whether the attribute information of the output command $SO_{CM1}$ matches the attribute setting value $AS_{231}$. When the attribute information of the output command $SO_{CM1}$ matches the attribute setting value $AS_{231}$, it means that the master circuit 211 has the power to access the peripheral circuit 231. Therefore, the bridge control circuit 222 transmits the output command $SO_{CM1}$ to the peripheral circuit 231. However, when the attribute information of the output command $SO_{CM1}$ does not match the attribute setting value $AS_{231}$, it means that the master circuit 211 does not have the power to access the peripheral circuit 231. Therefore, the bridge control circuit 222 does not transmit the output command $SO_{CM1}$ to the peripheral circuit 231. In one embodiment, the bridge control circuit 222 sends an interruption signal or generates an error response. In other embodiments, if the command $S_{CM1}$ is a read command, the bridge control circuit 222 may reply specific data (e.g., 0, 1 or random codes) to the master circuit 211. If the command $S_{CM1}$ is a write command, the bridge control circuit 222 ignores the write command provided by the master circuit 211.

Figure 6:
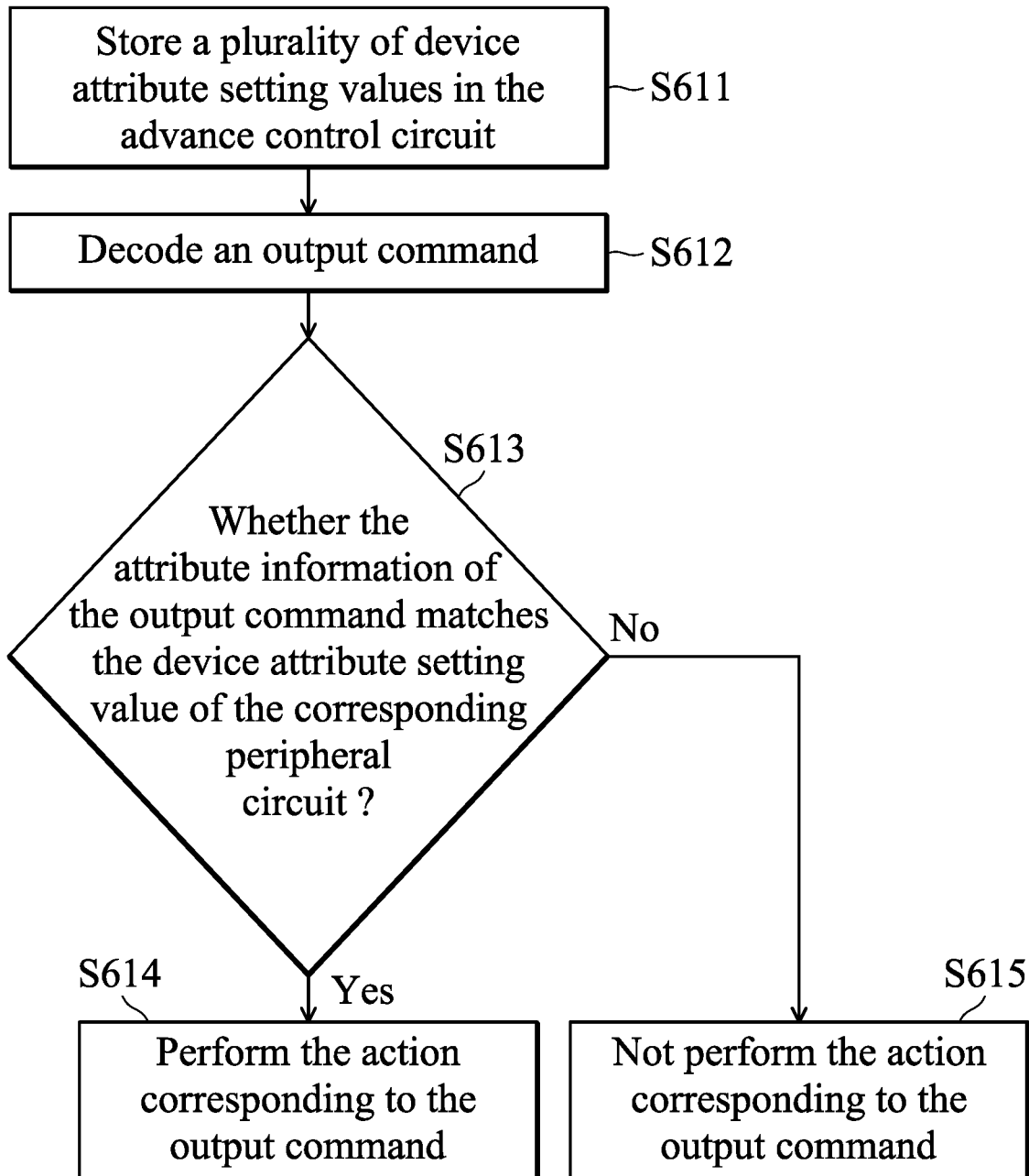
FIG. 6 is a flowchart of another exemplary embodiment of the control method, according to various aspects of the present disclosure.

FIG. 6 is a flowchart of another exemplary embodiment of the control method, according to various aspects of the present disclosure. The control method can be applied in an advance control circuit (e.g., 424 and 425 of FIG. 4) of a system on chip. First, a plurality of device attribute setting values are stored in the advance control circuit (step S611). Taking the advance control circuit 424 shown in FIG. 4 as an example, the resource domain access controller 441 stores the device attribute setting values $AS_{324A}$ and $AS_{32B}$. The device attribute setting value $AS_{324A}$ corresponds to the device circuit 442. The device attribute setting value $AS_{324B}$ corresponds to the device circuit 443. In other embodiments, the device attribute setting values $AS_{324A}$ and $AS_{324B}$ are stored in the device circuits 442 and 443, respectively. In some embodiments, step S611 is to store one device attribute setting value in one advance control circuit. Taking FIG. 3 as an example, the advance control circuit 324 stores one device attribute setting values (e.g., $AS_{324A}$).

Then, an output command is decoded (step S612). Taking FIG. 4 as an example, when the resource domain access controller 441 receives the output command $SO_{CM3}$, the resource domain access controller 441 decodes the output command $SO_{CM3}$ to obtain the address information and the attribute information of the output command $SO_{CM3}$. In some embodiment, the resource domain access controller 441 obtains which device circuit is pointed by the output command $SO_{CM3}$ according to the address information of the output command $SO_{CM3}$.

Next, a determination is made as to whether the attribute information of the output command matches the device attribute setting value of a corresponding device circuit (step S613). When the attribute information of the output command matches the device attribute setting value of the corresponding device circuit, the corresponding device circuit is controlled to perform the action corresponding to the output command (step S614). However, when the attribute information of the output command does not match the device attribute setting value of the corresponding device circuit, the corresponding device circuit does not perform the action corresponding to the output command (step S615). In one embodiment, when the attribute information of the output command does not match the device attribute setting value of the corresponding device circuit, the advance control circuit 424 performs a security action.

Taking FIG. 4 as an example, when the address information of the output command $SO_{CM3}$ points to the device circuit 442, the resource domain access controller 441 compares the attribute information of the output command $SO_{CM3}$ and the device attribute setting value $AS_{324A}$. When the attribute information of the output command $SO_{CM3}$ matches the device attribute setting value $AS_{324A}$, the resource domain access controller 441 sends the output command $SO_{CM3}$ to the device circuit 442. Therefore, the device circuit 442 performs the action corresponding to the output command $SO_{CM3}$. However, when the address information of the output command $SO_{CM3}$ points to the device circuit 442 and the attribute information of the output command $SO_{CM3}$ does not match the device attribute setting value $AS_{324A}$, the resource domain access controller 441 may perform a security action, such as to generate an error response. In other embodiments, if the output command $SO_{CM3}$ is a read command, the advance control circuit 424 may reply specific data which comprises a plurality of the value 0, a plurality of the value 1, or random codes to the master layer 410. If the output command $SO_{CM3}$ is a write command, the advance control circuit 424 may ignore the write command provided by the master layer 410.

Since the attribute setting values are distributed to different bridge control circuits and/or the advance control circuits, it is very straightforward architecture for system to do verification and implementation, and the strength of this architecture is good for debugging. Additionally, when the attribute information of an external command matches the attribute setting value of a corresponding peripheral circuit or a corresponding device circuit, the bridge control circuits and/or advance control circuits provides the external command to the corresponding peripheral circuit or the corresponding device circuit. Therefore, the peripheral circuit or the device circuit does not be accessed by an illegal operation so that the security of the system on chip is increased.

Control methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes a system on chip (SOC) for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes system on chip (SOC) for practicing the disclosed methods. When implemented on a general-purpose processor, the program code combines with the processor to provide a unique apparatus that operates analogously to application-specific logic circuits.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. A system on chip comprising:
   a first master circuit providing a first command;
   a second master circuit providing a second command;
   a routing circuit receiving the first command and the second command and providing a first output command;
   a first bridge control circuit receiving the first output command and storing a first attribute setting value; and
   a first peripheral circuit, wherein:
in response to the routing circuit receiving the first command and the first command pointing to the first peripheral circuit, the routing circuit uses the first command as the first output command,
in response to the routing circuit using the first command as the first output command, the first bridge control circuit determines whether attribute information of the first output command matches the first attribute setting value,
in response to the attribute information of the first output command matching the first attribute setting value, the first bridge control circuit provides the first output command to the first peripheral circuit.

2. The system on chip as claimed in claim 1, further comprising:
a second bridge control circuit receiving a second output command and storing a second attribute setting value; and
a second peripheral circuit coupled to the second bridge control circuit,
wherein:
in response to the routing circuit receiving the first command and the first command pointing to the second peripheral circuit, the routing circuit uses the first command as the second output command,
in response to the routing circuit using the first command as the second output command, the second bridge control circuit determines whether the attribute information of the second output command matches the second attribute setting value,
in response to the attribute information of the second output command matching the second attribute setting value, the second bridge control circuit provides the second output command to the second peripheral circuit.

3. The system on chip as claimed in claim 1, further comprising:
a third peripheral circuit coupled to the first bridge control circuit,
wherein:
the first bridge control circuit further stores a third attribute setting value,
in response to the routing circuit receiving the first command and the first command pointing to the third peripheral circuit, the routing circuit uses the first command as the first output command,
in response to the first bridge control circuit receiving the first output command, the first bridge control circuit determines whether the attribute information of the first output command matches the third attribute setting value,
in response to the attribute information of the first output command matching the third attribute setting value, the first bridge control circuit provides the first output command to the third peripheral circuit.

4. The system on chip as claimed in claim 3, wherein:
in response to the routing circuit receiving the first command, the routing circuit decodes the first command to obtain address information of the first command,
in response to the address information of the first command pointing to the first peripheral circuit or the third peripheral circuit, the routing circuit selects the first command as the first output command.

5. The system on chip as claimed in claim 4, wherein:
the first bridge control circuit decodes the first output command to obtain address information and the attribute information of the first output command,
in response to the address information of the first output command pointing to the first peripheral circuit, the first bridge control circuit determines whether the attribute information of the first output command matches the first attribute setting value,
in response to the address information of the first output command pointing to the third peripheral circuit, the first bridge control circuit determines whether the attribute information of the first output command matches the third attribute setting value.

6. The system on chip as claimed in claim 3, wherein in response to the first output command pointing to the first peripheral circuit and the attribute information of the first output command not matching the first attribute setting value, the first bridge control circuit replies specific data which is composed of 0, 1, or random codes to the first or second master circuit.

7. The system on chip as claimed in claim 1, wherein an operation frequency of the first master circuit is higher than 100 MHz, and an operation frequency of the first peripheral circuit is lower than 10 MHz.

8. The system on chip as claimed in claim 1, wherein one of the first master circuit and the second master circuit is a secure device and the other of the first master circuit and the second master circuit is a direct memory access (DMA) controller.

9. The system on chip as claimed in claim 1, further comprising:
an advance control circuit receiving a third output command and comprising:
a first device circuit comprising a first algorithm;
a second device circuit comprising a second algorithm different from the first algorithm; and
a resource domain access controller storing a fourth attribute setting value and a fifth attribute setting value,
wherein:
the resource domain access controller decodes the third output command to obtain address information and attribute information of the third output command,
in response to the address information of the third output command pointing to the first device circuit, the resource domain access controller compares the attribute information of the third output command and the fourth attribute setting value,
in response to the attribute information of the third output command matching the fourth attribute setting value, the resource domain access controller sends the third output command to the first device circuit and the first device circuit performs the third output command.

10. The system on chip as claimed in claim 9, wherein in response to the routing circuit receiving the first command and the first command pointing to the first device circuit or the second device circuit, the routing circuit uses the first command as the third output command.

11. The system on chip as claimed in claim 9, wherein an operation frequency of the advance control circuit is higher than 100 MHz, and an operation frequency of the first peripheral circuit is lower than 10 MHz.

12. The system on chip as claimed in claim 9, wherein the first device circuit is a gigabit Ethernet.

13. A device layer comprising:
a routing circuit using a first command as a first output command or a second output command;
a first bridge control circuit receiving the first output command, storing a first attribute setting value, and coupled to a first peripheral circuit; and
a second bridge control circuit receiving the second output command, storing a second attribute setting value, and coupled to a second peripheral circuit.

14. The device layer as claimed in claim 13, wherein:
the routing circuit decodes the first command to obtain address information of the first command,
in response to the address information of the first command pointing to the first peripheral circuit, the routing circuit uses the first command as the first output command,
in response to the address information of the first command pointing to the second peripheral circuit, the routing circuit uses the first command as the second output command.

15. The device layer as claimed in claim 13, wherein:
the first bridge control circuit stores a third attribute setting value and is coupled to a third peripheral circuit,
in response to the first bridge control circuit receiving the first output command, the first bridge control circuit decodes the first output command to obtain address information and attribute information of the first output command,
in response to the address information of the first output command pointing to the first peripheral circuit, the first bridge control circuit compares the attribute information of the first output command and the first attribute setting value, and
in response to the attribute information of the first output command matching the first attribute setting value, the first bridge control circuit provides the first output command to the first peripheral circuit.

16. The device layer as claimed in claim 15, wherein:
in response to the address information of the first output command pointing to the third peripheral circuit, the first bridge control circuit compares the attribute information of the first output command and the third attribute setting value, and
in response to the attribute information of the first output command matching the third attribute setting value, the first bridge control circuit provides the first output command to the third peripheral circuit.

17. The device layer as claimed in claim 13, further comprising:
an advance control circuit receiving a third output command and comprising:
 a first device circuit comprising a first algorithm;
 a second device circuit comprising a second algorithm different from the first algorithm; and
 a resource domain access controller storing a fourth attribute setting value and a fifth attribute setting value,
wherein:
in response to the first command pointing to the first device circuit or the second device circuit, the routing circuit uses the first command as the third output command,
the resource domain access controller decodes the third output command to obtain address information and attribute information of the third output command,
in response to the address information of the third output command pointing to the first device circuit, the resource domain access controller compares the attribute information of the third output command and the fourth attribute setting value,
in response to the attribute information of the third output command matching the fourth attribute setting value, the resource domain access controller sends the third output command to the first device circuit and the first device circuit performs the third output command.

18. A system on chip comprising:
a first peripheral circuit;
a second peripheral circuit; and
a bridge control circuit storing a first attribute setting value and a second attribute setting value, and determining that attribute information of an output command matches the first attribute setting value or the second attribute setting value,
wherein:
in response to the attribute information of the output command matching the first attribute setting value, the bridge control circuit provides the output command to the first peripheral circuit, and
in response to the attribute information of the output command matching the second attribute setting value, the bridge control circuit provides the output command to the second peripheral circuit.

19. The system on chip as claimed in claim 18, wherein the bridge control circuit decodes the output command to obtain address information and the attribute information of the output command and determines that the address information of the output command points to the first peripheral circuit or the second peripheral circuit.

20. The system on chip as claimed in claim 18, wherein:
in response to the address information of the output command pointing to the first peripheral circuit, the bridge control circuit compares the attribute information of the output command and the first attribute setting value,
in response to the attribute information of the output command not matching the first attribute setting value, the bridge control circuit replies specific data which is composed of 0, 1, or random codes to a master circuit which provides the output command.

* * * * *